US010336310B2

(12) United States Patent
Jang

(10) Patent No.: US 10,336,310 B2
(45) Date of Patent: Jul. 2, 2019

(54) METHOD AND APPARATUS FOR STARTING ENGINE OF MILD HYBRID ELECTRIC VEHICLE

(71) Applicants: HYUNDAI MOTOR COMPANY, Seoul (KR); KIA MOTORS CORPORATION, Seoul (KR)

(72) Inventor: Hwa Yong Jang, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 78 days.

(21) Appl. No.: 15/835,259

(22) Filed: Dec. 7, 2017

(65) Prior Publication Data

US 2019/0143953 A1    May 16, 2019

(30) Foreign Application Priority Data

Nov. 14, 2017    (KR) .................. 10-2017-0151529

(51) Int. Cl.
*B60W 10/06*    (2006.01)
*B60W 20/14*    (2016.01)

(52) U.S. Cl.
CPC ............ *B60W 10/06* (2013.01); *B60W 20/14* (2016.01)

(58) Field of Classification Search
CPC ...... B60W 10/06; B60W 10/08; B60W 20/14; B60W 20/40; F02D 41/123; F02D 41/14; F02D 41/1494; F01N 11/00; F01N 11/007; F01N 2240/16; F01N 2560/02; F01N 2560/025; F01N 2560/20
USPC .................................................. 701/113–115
See application file for complete search history.

(56) References Cited

U.S. PATENT DOCUMENTS

| 2012/0232732 A1* | 9/2012 | Tsuda ....................... B60K 6/48 |
| | | 701/22 |
| 2014/0074334 A1* | 3/2014 | Tagawa .................. B60K 6/445 |
| | | 701/22 |
| 2015/0075268 A1* | 3/2015 | Qi .......................... G01N 27/22 |
| | | 73/114.55 |

* cited by examiner

*Primary Examiner* — John Kwon
*Assistant Examiner* — Johnny H Hoang
(74) *Attorney, Agent, or Firm* — Knobbe Martens Olson & Bear LLP

(57) ABSTRACT

A method and an apparatus for starting an engine of a mild hybrid electric vehicle are disclosed. A method for starting an engine of a mild hybrid electric vehicle includes operating a mild hybrid starter & generator (MHSG) to perform an engine cranking operation, calculating an aging factor of the engine based on a time to reach a target RPM, calculating a moving average value of the aging factor, determining whether the moving average value of the aging factor is between a first reference value and a second reference value, and increasing cranking torque of the MHSG when the moving average value of the aging factor is between the first reference value and the second reference value.

10 Claims, 5 Drawing Sheets

METHOD AND APPARATUS FOR STARTING ENGINE OF MILD HYBRID ELECTRIC VEHICLE

CROSS-REFERENCE TO RELATED APPLICATION

This application claims priority to and the benefit of Korean Patent Application No. 10-2017-0151529 filed in the Korean Intellectual Property Office on Nov. 14, 2017, the entire contents of which are incorporated herein by reference.

BACKGROUND

(a) Field

The present disclosure relates to a mild hybrid electric vehicle. More particularly, the present disclosure relates to a method and an apparatus for starting an engine of a mild hybrid electric vehicle.

(b) Description of the Related Art

As is generally known in the art, a hybrid electric vehicle uses an internal combustion engine and a battery power source together. The hybrid electric vehicle efficiently combines torque of the internal combustion engine and torque of a motor. Hybrid electric vehicles may be divided into a hard type and a mild type according to a power sharing ratio between an engine and a motor. In the case of the mild type of hybrid electric vehicle (hereinafter referred to as a mild hybrid electric vehicle), a mild hybrid starter & generator (MHSG) configured to start the engine or generate electricity according to an output of the engine is used instead of an alternator. In the case of the hard type of hybrid electric vehicle, a driving motor for generating driving torque is used in addition to an integrated starter & generator (ISG) configured to start the engine or generate electricity.

The disclosure of this section is to provide background of the invention. Applicant notes that this section may contain information available before this application. However, by providing this section, Applicant does not admit that any information contained in this section constitutes prior art.

SUMMARY

An MHSG may assist torque of the engine according to running states of the vehicle, and may charge a battery (e.g., a 48 V battery) through regenerative braking. Accordingly, fuel efficiency of the mild hybrid electric vehicle may be improved.

As shown in FIG. 5, for starting start an engine in a hybrid electric vehicle, RPM of the engine is increased to a target RPM. A time until the speed of the engine reaches the target RPM is increased ($t_1 \rightarrow t_2$) according to deterioration of the engine, and a driver feels a deterioration of startability.

The present disclosure has been made in an effort to provide a method and an apparatus for starting an engine of a mild hybrid electric vehicle having advantages of maintaining startability of the engine.

A method for starting an engine of a mild hybrid electric vehicle an exemplary embodiment of the present invention may include: operating a mild hybrid starter & generator (MHSG) to perform an engine cranking operation when a starting condition of the engine is satisfied; calculating an aging factor of the engine when a speed of the engine reaches a target RPM; calculating a moving average value of the aging factor; determining whether the moving average value of the aging factor is between a first reference value and a second reference value; and increasing cranking torque of the MHSG when the moving average value of the aging factor is between the first reference value and the second reference value.

The aging factor may be calculated by an equation of $$F = \frac{S_T}{\Delta t},$$

where, $S_T$ is the target RPM and $\Delta t$ is a time until the speed of the engine reaches the target RPM.

The average value of the aging factor may be calculated by an equation of $$MAF_k = \sum_{i=1}^{n} (F_{k-n+i} \times WF_i),$$

where $F_{k-n+i}$ is the aging factor at (k−n+i)-th starting condition and WFi is an i-th weight value An increment of the cranking torque of the MHSG may be determined based on a difference value between the moving average value of the aging factor and the second reference value.

The method may further include displaying a warning lamp or a warning message indicating that startability of the engine is deteriorated when the moving average value of the aging factor is less than the second reference value.

An apparatus for starting an engine of a mild hybrid electric vehicle an exemplary embodiment of the present invention may include: a mild hybrid starter & generator (MHSG) starting the engine or generating electricity according to an output of the engine; an engine speed sensor detecting a speed of the engine; and a controller controlling an operation of the MHSG based on the speed of the engine, wherein the controller may perform an engine cranking operation when a starting condition of the engine is satisfied, calculate an aging factor of the engine when the speed of the engine reaches a target RPM, calculate a moving average value of the aging factor, and increase cranking torque of the MHSG when the moving average value of the aging factor is between a first reference value and a second reference value.

The aging factor may be calculated by an equation of $$F = \frac{S_T}{\Delta t},$$

where, $S_T$ is the target RPM and $\Delta t$ is a time until the speed of the engine reaches the target RPM The average value of the aging factor may be calculated by an equation $$MAF_k = \sum_{i=1}^{n} (F_{k-n+i} \times WF_i),$$

where, $F_{k-n+i}$ is the aging factor at (k−n+i)-th starting condition and WFi is an i-th weight value.

The controller may determine an increment of the cranking torque of the MHSG based on a difference value between the moving average value of the aging factor and the second reference value.

The controller may display a warning lamp or a warning message indicating that startability of the engine is deteriorated when the moving average value of the aging factor is less than the second reference value.

According to an exemplary embodiment of the present invention, startability of the engine may be maintained In addition, when the startability of the engine is excessively deteriorated, a driver may recognize necessity of maintenance through the warning lamp or the warning message.

DESCRIPTION OF SYMBOLS

Figure 1:
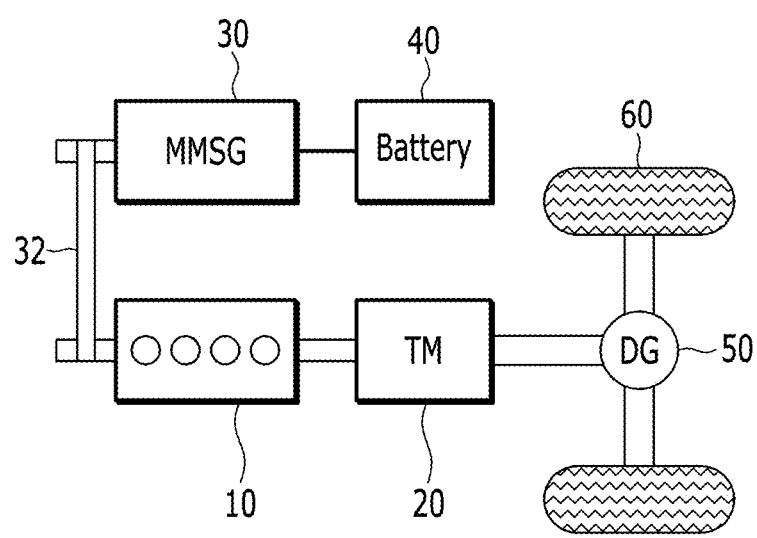
FIG. 1 is a block diagram of a mild hybrid electric vehicle according to an exemplary embodiment of the present invention.

| 10: Engine | 20: Transmission |
|---|---|
| 30: MHSG | 40: Battery |
| 50: Differential gear apparatus | 60: Wheel |
| 70: Ignition switch | 80: Engine speed sensor |
| 90: Controller | 100: Display device |

DETAILED DESCRIPTION

In the following detailed description, embodiments of the present invention will be described more fully with reference to the accompanying drawings, in which embodiments of the invention are shown. However, the present invention is not limited the embodiments which are described herein, and may be modified in various different ways.

Parts which are not related with the description are omitted for clearly describing embodiments of the present invention, and like reference numerals refer to like or similar elements throughout the specification.

Since each component in the drawings is arbitrarily illustrated for easy description, the present invention is not particularly limited to the components illustrated in the drawings.

An aspect of the present invention provides a method and system for controlling a starter (starter/generator, MHSG) of a hybrid electric vehicle to start a combustion engine of the vehicle.

In embodiments, at least one controller of the vehicle monitors RPM of the engine from a driver's command to start the engine (t=0) using the engine speed sensor 80. The controller stores a profile of engine RPM for every starting of the engine in a memory. The controller computes a first time (Δt, FIG. 4) to reach a predetermined target RPM for each starting of the engine, and determines that the first time to reach the target RPM is within a desirable range. Subsequently, when it is determined that the first time is greater than a predetermined of upper limit of the desirable range, the controller increases a target engine cranking torque of the starter/generator such that that, in the next starting, the engine reaches the target RPM faster than the current start and faster than the upper limit of the desirable range.

In embodiments, the controller controls the starter/motor using two different target engine cranking torques: a first target engine cranking torque for cold starting (starting of the engine when a temperature of the engine is lower than a predetermined reference, or after a predetermined time from last operation of the engine), and a second target engine cranking torque for warm starting (starting of the engine when a temperature of the engine is greater than a predetermined reference, or starting when the hybrid vehicle is coasting or driving using a motor/generator). In embodiments, to adjust the target engine cranking torque for cold starting, the controller considers data from previous cold starts only, and does not consider data of previous warm starts. In embodiment, the controller does not collect data or compute time to reach a target RPM from warm starts.

In embodiments, to adjust a target engine cranking torque of the starter/generator, the controller considers engine RPM profiles (or delays to reach the target RPM) of a predetermined number of previous starts. In embodiments, to determine whether time to reach the target RPM is within a desirable range, the controller computes an index (aging factor) based on the last ten previous starts. In embodiments, the controller computes an increase of target engine cranking torque using a predetermined computation table specifying target engine cranking torques for delays to reach the target RPM.

FIG. 1 is a block diagram of a mild hybrid electric vehicle according to an embodiment of the present invention.

As shown in FIG. 1, a mild hybrid electric vehicle according to an embodiment of the present invention includes an engine 10, a transmission 20, a mild hybrid starter & generator (MHSG) 30, a battery 40, a differential gear apparatus 50, and a wheel 60.

The engine 10 burns fuel and air to convert chemical energy into mechanical energy, and various engines such as a gasoline engine and a diesel engine may be used as the engine 10.

In connection with torque transmission of a mild hybrid electric vehicle, torque generated from the engine 10 is transmitted to an input shaft of the transmission 20, and torque output from an output shaft of the transmission 20 is transmitted to an axle via the differential gear apparatus 50. The axle rotates the 60 such that the mild hybrid electric vehicle runs by the torque generated from the engine 10.

The MHSG 30 converts electrical energy into mechanical energy or converts mechanical energy into electrical energy. The MHSG 30 starts the engine 10 or generates electricity according to an output of the engine 10. In addition, the MHSG 30 may assist the torque of the engine 10. The torque of the engine 10 may be used as main torque, and torque of the MHSG 30 may be used as auxiliary torque. The engine 10 and the MHSG 30 may be connected to each other through a belt 32.

The battery 40 may supply electricity to the MHSG 30, and may be charged through electricity recovered by the MHSG 30. The battery 40 may be a 48 V battery. The mild hybrid electric vehicle may further include a low voltage battery DC-DC converter (LDC) converting a voltage supplied from the battery 40 into a low voltage, and a low voltage battery (e.g., a 12 V battery) supplying a low voltage to electrical loads (e.g., a head lamp and an air conditioner).

Figure 2:
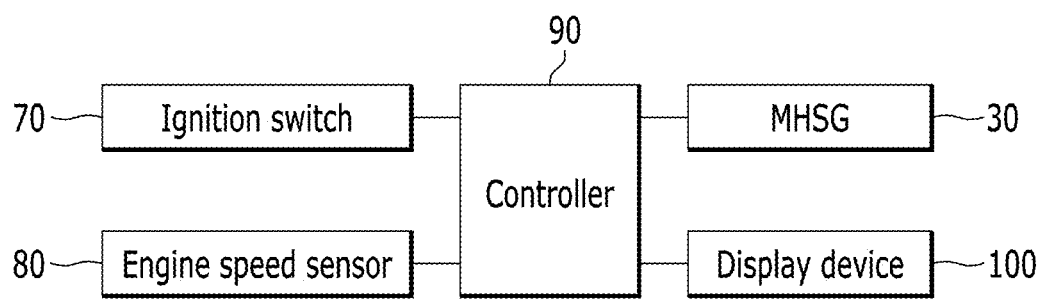
FIG. 2 is a block diagram illustrating an apparatus for starting an engine of a mild hybrid electric vehicle according to an exemplary embodiment of the present invention.

FIG. 2 is a block diagram illustrating an apparatus for starting an engine of a mild hybrid electric vehicle according to an embodiment of the present invention.

As shown in FIG. 2, an apparatus for starting an engine of a mild hybrid electric vehicle according to an embodiment of the present invention may include an ignition switch 70, an engine speed sensor 80, a controller 90, a mild hybrid starter & generator (MHSG) 30, and a display device 100.

The ignition switch 72 may include a plurality of contact points. The plurality of contact points may include an OFF contact point, an ACC contact point, an ON contact point, and a START contact point. When the OFF contact point is selected, the engine 10 is turned off. When the ACC contact point is selected, accessory devices such as a radio may be used. When the ON contact point is selected, electronic devices using a voltage of the battery 50 may be used. When the START contact point is selected the engine 10 is started. Contact points of the ignition switch 70 may be selected by a starting key or a starting button.

The engine speed sensor 80 detects a speed of the engine 10, and transmits a signal corresponding thereto to the controller 90. The engine speed sensor 80 may detect the speed of the engine 10 based on a phase change of a crankshaft.

The controller 90 may control operations of the MHSG 30 and the display device 100 based on signals of the ignition switch 70 and the engine speed sensor 80. The controller 90 may be implemented with one or more processors executed by a predetermined program, and the predetermined program may include a series of commands for performing each step included in a method for starting an engine of a mild hybrid electric vehicle according to an embodiment of the present invention.

The display device 100 may display information processed by the controller 90. The display device 100 may be a component of a cluster device or an audio-video-navigation (AVN) device. The controller 90 may operate the display device 100 to display a warning lamp or a warning message indicating that startability of the engine 10 is deteriorated.

Figure 3:
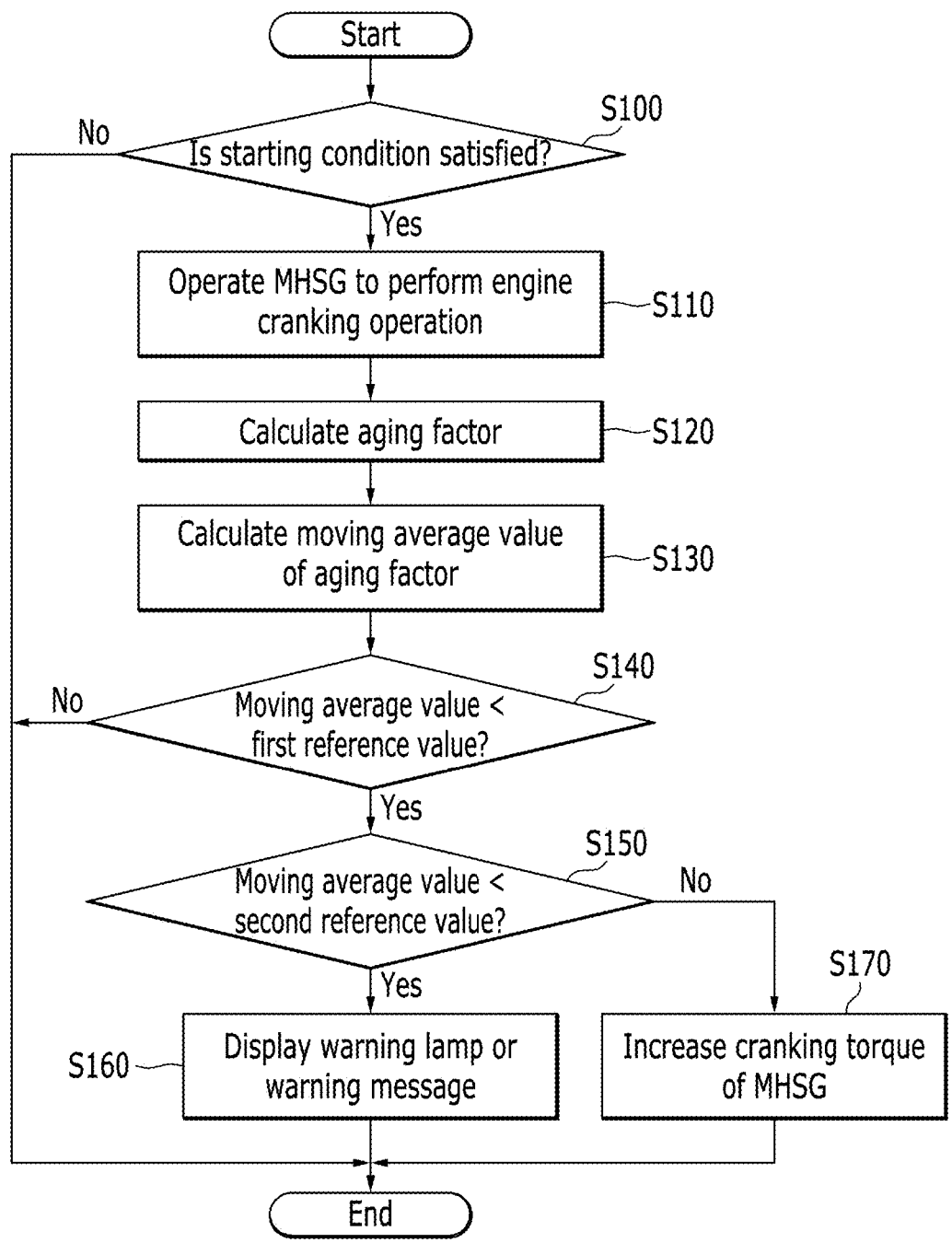
FIG. 3 is a flowchart illustrating a method for starting an engine of a mild hybrid electric vehicle according to an exemplary embodiment of the present invention.
Figure 4:
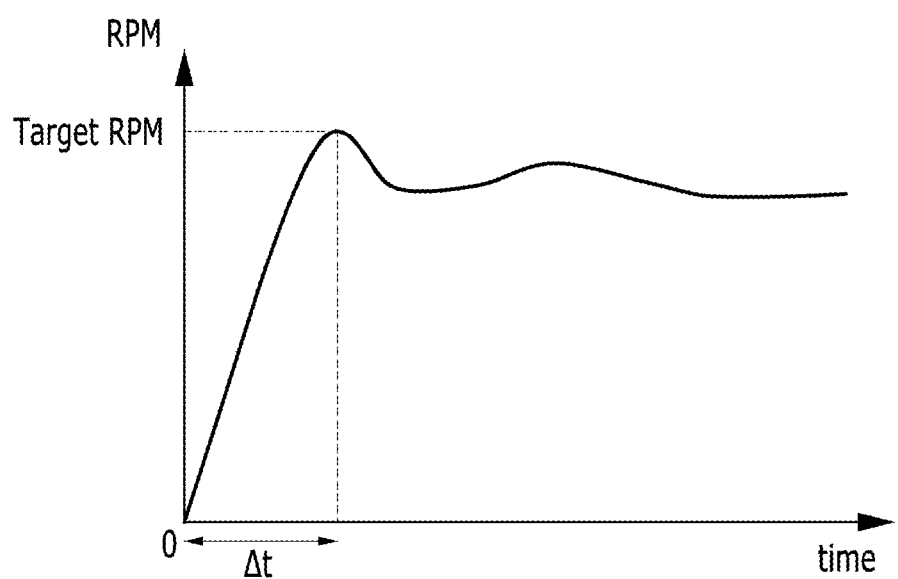
FIG. 4 is a graph for explaining a method for starting an engine of a mild hybrid electric vehicle according to an exemplary embodiment of the present invention.
Figure 5:
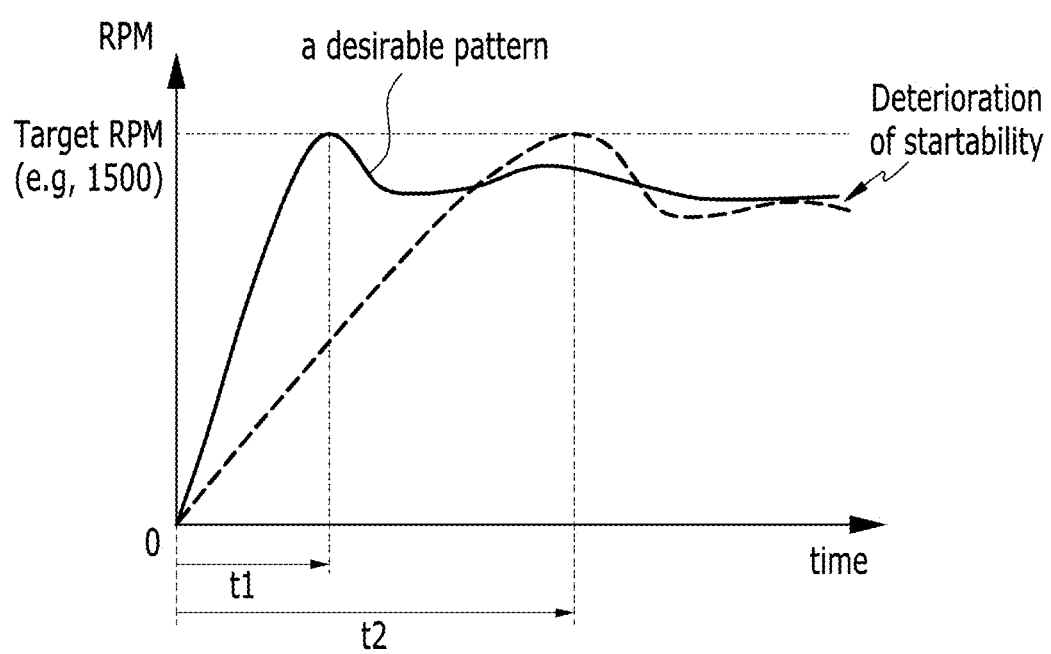
FIG. 5 is a graph for explaining a method for starting an engine of a mild hybrid electric vehicle according the related art.

FIG. 3 is a flowchart illustrating a method for starting an engine of a mild hybrid electric vehicle according to an embodiment of the present invention, and FIG. 4 is a graph for explaining a method for starting an engine of a mild hybrid electric vehicle according to an embodiment of the present invention.

Referring to FIG. 3 and FIG. 4, a method for starting an engine of a mild hybrid electric vehicle according to an embodiment of the present invention may begin with determining whether a starting condition of the engine 10 is satisfied at step S100. The starting condition of the engine 10 may be satisfied when the START contact point is selected. In addition, if Idle Stop and Go (ISG) system is applied to the mild hybrid electric vehicle, the starting condition may be satisfied when the engine 10 is restarted.

When the starting condition of the engine 10 is not satisfied at step S100, the controller 90 finishes the method for starting the engine of the mild hybrid electric vehicle according to an embodiment of the present invention.

When the starting condition of the engine 10 is satisfied at step S100, the controller 90 operates the MHSG 30 to perform an engine cranking operation at step S110. In detail, the controller 90 may operate the MHSG 30 to generate a predetermined cranking torque such that the speed of the engine 10 is increased to a target RPM $S_T$. After that, the controller 90 generates engine torque using combustion of the fuel.

When the speed of the engine 10 reaches the target RPM $S_T$, the controller 90 calculates an aging factor of the engine 10 at step S120.

The aging factor F may be calculated by the following equation.

$$F = \frac{S_T}{\Delta t}$$

Wherein, $S_T$ is the target RPM, and $\Delta t$ is a time until the speed of the engine 10 reaches the target RPMAs the aging factor decreases, a time to start the engine 10 increases.

The controller 90 may calculate a moving average $MAF_k$ of the aging factor at a current starting condition (k-th starting condition) based on the latest n aging factors $F_k$ to $F_{k-n+i}$ and n weight values $WF_1$ to $WF_n$ at step S130. The n may be 10. The moving average value $MAF_k$ of the aging factor may be calculated by the following equation.

$$MAF_k = \sum_{i=1}^{n} (F_{k-n+i} \times WF_i)$$

Wherein, $F_{k-n+i}$ is the aging factor at (k−n+i)-th starting condition, and WFi is an i-th weight value.

A sum of the n weight values $WF_1$ to $WF_n$ is 1, and an i-th weight value may be equal to or less than (i+1)-th weight value (i.e., $WF_i \leq WF_{i+i}$). The (i+1)-th weight value is set to be equal to or greater than the i-th weight value, and thus the latest aging factor has the greatest effect on the moving average value $MAF_k$.

The controller 90 determines whether the moving average of the aging factor is between a first reference value and a second reference value at steps S140 to S150.

The controller 90 compares the moving average of the aging factor with the first reference value at step S140. The first reference value may be set by a person of ordinary skill in the art to determine whether a target startability is satisfied.

When the moving average value of the aging factor is equal to or greater than the first reference vale at step S140, the controller 90 finishes the method for starting the engine of the mild hybrid electric vehicle according to an embodiment of the present invention. After that, when a next starting condition is satisfied, the controller 90 may operate the MHSG 30 to generate the same cranking torque as the current starting condition.

When the moving average value of the aging factor is less than the first reference value at step S140, the controller 90 compares the moving average value of the aging factor with the second reference value ate step S150. The second reference value may be set by a person of ordinary skill in the art to determine whether the startability of the engine 10 is excessively deteriorated.

When the moving average value of the aging factor is less than the second reference value at step S150, the controller 90 may operate the display device 100 to display a warning lamp or warning message indicating that the startability of the engine 10 is deteriorated at step S160.

When the moving average value of the aging factor is equal to or greater than the second reference value at step S150, the controller 90 increases the cranking torque of the MHSG 30 at step S170. An increment amount of the cranking torque of the MHSG 30 may be determined based on a difference value between the moving average value of the aging factor and the second reference value. In other words, as the difference value increases, the controller 90 may increase the increment amount of the cranking torque of the MHSG 30. Since the cranking torque of the MHSG 30 is increased, a time until the speed of the engine 10 reaches the target RPM may be reduced at a next starting of the engine 10.

As described above, according to an embodiment of the present invention, startability of the engine 10 may be maintained. In addition, when the startability of the engine 10 is excessively deteriorated, a driver may recognize necessity of maintenance through the warning lamp or the warning message.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

While this invention has been described in connection with certain embodiments, it is to be understood that the invention is not limited to the disclosed embodiments, but, on the contrary, is intended to cover various modifications and equivalent arrangements included within the spirit and scope of the appended claims.

What is claimed is:

1. A method for starting an engine of a mild hybrid electric vehicle, comprising:
    operating a mild hybrid starter & generator (MHSG) to perform an engine cranking operation when a starting condition of the engine is satisfied;
    calculating an aging factor of the engine when a speed of the engine reaches a target RPM;
    calculating a moving average value of the aging factor;
    determining whether the moving average value of the aging factor is between a first reference value and a second reference value; and
    increasing cranking torque of the MHSG when the moving average value of the aging factor is between the first reference value and the second reference value.

2. The method of claim 1, wherein the aging factor is calculated by an equation of $$F = \frac{S_T}{\Delta t},$$

wherein, $S_T$ is the target RPM and $\Delta t$ is a time until the speed of the engine reaches the target RPM.

3. The method of claim 1, wherein the average value of the aging factor is calculated by an equation of $$MAF_k = \sum_{i=1}^{n} (F_{k-n+i} \times WF_i),$$

wherein, $F_{k-n+i}$ is the aging factor at (k–n+i)-th starting condition and $WF_i$ is an i-th weight value.

4. The method of claim 1, wherein an increment of the cranking torque of the MHSG is determined based on a difference value between the moving average value of the aging factor and the second reference value.

5. The method of claim 1, further comprising displaying a warning lamp or a warning message indicating that startability of the engine is deteriorated when the moving average value of the aging factor is less than the second reference value.

6. An apparatus for starting an engine of a mild hybrid electric vehicle, comprising:
    a mild hybrid starter & generator (MHSG) starting the engine or generating electricity according to an output of the engine;
    an engine speed sensor detecting a speed of the engine; and
    a controller controlling an operation of the MHSG based on the speed of the engine,
    wherein the controller performs an engine cranking operation when a starting condition of the engine is satisfied,
    calculates an aging factor of the engine when the speed of the engine reaches a target RPM,
    calculates a moving average value of the aging factor, and
    increases cranking torque of the MHSG when the moving average value of the aging factor is between a first reference value and a second reference value.

7. The apparatus of claim 6, wherein the aging factor is calculated by an equation of $$F = \frac{S_T}{\Delta t},$$

wherein, $S_T$ is the target RPM and $\Delta t$ is a time until the speed of the engine reaches the target RPM.

8. The apparatus of claim 6, wherein the average value of the aging factor is calculated by an equation of $$MAF_k = \sum_{i=1}^{n} (F_{k-n+i} \times WF_i),$$

wherein, $F_{k-n+i}$ is the aging factor at (k–n+i)-th starting condition and $WF_i$ is an i-th weight value.

9. The apparatus of claim 6, wherein the controller determines an increment of the cranking torque of the MHSG based on a difference value between the moving average value of the aging factor and the second reference value.

10. The apparatus of claim 6, wherein the controller displays a warning lamp or a warning message indicating that startability of the engine is deteriorated when the moving average value of the aging factor is less than the second reference value.

* * * * *